United States Patent Office 3,642,671
Patented Feb. 15, 1972

3,642,671
POLYETHYLENIMINE-DEXTROSE AND/OR PRECURSORS OF DEXTROSE ADHESIVE COMPOSITION
Chester A. Lesinski, Bay City, Mich., assignor to The Dow Chemical Company, Midland, Mich.
No Drawing. Filed Apr. 14, 1969, Ser. No. 816,099
Int. Cl. C08b 25/02, 25/04
U.S. Cl. 260—9
8 Claims

ABSTRACT OF THE DISCLOSURE

A novel adhesive composition for cellulosic materials is described which comprises polyethylenimine in combination with dextrose. The composition is particularly useful as an adhesive for wood in the preparation of plywood, chipboard, and other wood laminates.

BACKGROUND OF THE INVENTION

The plywood industry is currently using phenol-formaldehyde resins to bind most of the exterior grade plywood produced today. These glues have proved to be suitably efficient in that they give a strong water-resistant bond and are relatively inexpensive. However, they must be cooked prior to use and must be used soon thereafter. An adhesive composition for the plywood industry which would eliminate this preheating or cooking step would be very desirable.

SUMMARY OF THE INVENTION

It has now been discovered that a novel composition which comprises polyethylenimine in combination with dextrose is an excellent adhesive for bonding cellulosic materials. The composition is particularly useful as the adhesive for wood chips in the preparation of plywood. This utility is based upon the excellent cellulosic adhesive properties of the subject composition and its water resistance after curing.

The subject composition is suitably prepared by dissolving dextrose in an aqueous polyethylenimine (PEI) solution in an amount between about 3.0 and 50 wt. percent of dextrose, based on the total composition weight, and between about 20 and 55 wt. percent of PEI, based on the total composition weight. The novel composition is preferentially an aqueous solution of PEI and dextrose, wherein PEI and dextrose are each present in an amount of 20 to 30 weight percent.

PEI's which are particularly suitable in the subject composition typically have an average molecular weight between 15,000 and 100,000, and above. PEI's having an average molecular weight higher or lower than the above range can be used but less desirable physical and adhesive properties of the final composition are obtained. At higher molecular weights, the composition is quite viscous, making preparation and application more difficult, and at lower molecular weights, the adhesive properties are lower.

Dextrose in PEI is found to be the most efficient adhesive composition and is preferred, but mixtures of PEI and alternative compounds which are precursors of dextrose, such as sucrose, corn syrup, molasses, dextrin, and other like compounds, are also adhesive compositions and may be used. However, adhesive compositions which replace dextrose with such compounds are not as effective. By the term "dextrose," however, I mean to include the compound dextrose and its precursors.

The adhesive compositions may advantageously contain additives which are common to the adhesive art, such as fungicides, preservatives, wood fillers, and the like.

The method of preparing chipboard from wooden chips is well known and comprises the steps of coating the wooden chips with a curable, pre-cooked adhesive, thereafter placing a plurality of the coated chips in a mold and curing the materials under heat and pressure. The curing pressure is typically 100 to 300 p.s.i. and the temperature is 25° to 200° C. An improvement is realized in both the process and product of preparing such boards by replacing the prior art adhesives with the subject adhesive composition.

The method of preparing plywood is likewise well known and comprises the steps (a) coating a plurality of boards with an adhesive, (b) preparing a laminate of the coated boards, and (c) curing the laminate under pressure and heat, conditions which are similar to the above chipboard preparation.

SPECIFIC EMBODIMENTS

Aqueous solutions of PEI and dextrose, or a dextrose precursor, were mixed and applied to 6" x 6" veneers of Douglas fir at a glue level of 65 lb./MDGL (1000 sq. ft. of double glue line) with a coarse Meyer rod. Test panels were built using three veneers in the form of a 3-layered laminate, wherein the two outer veneers were joined to a common core veneer by a layer of adhesive. The panels were pressed in a 70 ton hydraulic press (at 285° F. and 175 p.s.i.) within 10 minutes of the glue application, which was consistent with industrial practice. After the panels were pressed and cooled, they were pried apart and visually inspected for approximate percent wood failure (as distinguished from glue-line failure). The test results of several solutions are tabulated in Table 1.

TABLE 1

| Formulation (in H₂O) | Total solids | Wood failure |
|---|---|---|
| PEI-A [1] | 33 | 0 |
| PEI-A—10 g., Corn starch—3 g | 48.5 | 5 |
| PEI-A—10 g., Sucrose—4 g | 52.1 | 25 |
| Dextrose—4 g | 28.6 | 0 |
| PEI-A—10 g., corn syrup [2]—5 g | ca. 48.6 | 30 |
| PEI-A—10 g., molasses [2][3]—5 g | ca. 48.6 | 30 |
| PEI-A—10 g., dextrin—4 g | 52.1 | 10 |
| PEI-B [4]—10 g., dextrose—4 g | 52.1 | 90 |
| PEI-A—10 g., dextrose—4 g | 52.1 | 90 |
| PEI-A—10 g., dextrose—3 g | 48.5 | 95 |
| PEI-A—10 g., dextrose—2 g | 44.1 | 95 |
| PEI-A—10 g., dextrose—1 g | 39.1 | 80 |
| PEI-C [5]—10.0 g., dextrose—4 g | 52.1 | 80 |
| PEI-A—10.0 g., dextrose—3 g., H₂O—10 g | 27.4 | 90 |
| PEI-A—10 g., dextrose—3 g., H₂O—20 g | 19.1 | 80 |
| PEI-A—10 g., dextrose—1 g., H₂O—20 g | 13.9 | 50 |

[1] PEI-A (33% solids in aqueous solution) has an average molecular weight of 50,000 to 100,000.
[2] Corn Syrup—a mixture of dextrose, maltose, and dextrins with about 20% water by weight.
[3] Molasses—the syrupy mother liquid left after sucrose has been removed from the sugar cane or sugar beet juice containing a mixture of sucrose and other sugars and about 20% water by weight.
[4] PEI-B (33% solids in aqueous solution) has an average molecular weight of 40,000 to 60,000.
[5] PEI-C (33% solids in aqueous solution) has an average molecular weight of 15,000 to 25,000.

I claim:
1. An adhesive composition comprising:
   (a) polyethylenimine, in an amount between 20 and 55 weight percent, based on total composition weight; in combination with
   (b) dextrose or precursors of dextrose, in an amount between 3.0 and 50 weight percent, based on total composition weight.
2. The composition defined in claim 5 wherein said polyethylenimine has a molecular weight between 15,000 and 100,000.
3. The composition defined in claim 1 wherein said polyethylenimine and the dextrose are each present in an amount of 20 to 30 weight percent, the balance being water.
4. The composition defined in claim 3 wherein said polyethylenimine has a molecular weight between 15,000 and 100,000.

5. The composition defined in claim 1 wherein said polyethylenimine has a molecular weight of at least 15,000.

6. The composition defined by claim 1 wherein (b) is dextrose.

7. The composition defined by claim 6 wherein said polyethylenimine has a molecular weight between 15,000 and 100,000.

8. The composition defined by claim 1 wherein (b) is corn starch, sucrose, corn syrup, molasses or dextrin.

References Cited
UNITED STATES PATENTS 3,524,827   8/1970   Johnson et al. _____ 260—9

HAROLD D. ANDERSON, Primary Examiner

E. WOODBERRY, Assistant Examiner

U.S. Cl. X.R.

106—162, 210; 260—209 R